Patented Apr. 27, 1954

2,676,939

UNITED STATES PATENT OFFICE 2,676,939

PLASTIC COMPOSITIONS CONTAINING STABILIZED POLYVINYL ACETALS

Hans-Joachim Hahn, Frankfurt am Main, and Otto Horn, Frankfurt am Main Hochst, Germany, assignors to Farbwerke Hoechst Aktiengesellschaft vormals Meister Lucius und Bruning, Frankfurt am Main Hochst, Germany, a German company No Drawing. Application May 8, 1951,
Serial No. 225,266

Claims priority, application Germany
May 15, 1950

8 Claims. (Cl. 260—30.2)

The present invention relates to plastic compositions. The polyvinylacetals which are obtained by condensation of polyvinyl alcohol or polyvinyl esters with aldehydes or ketones are not stable to heat, viz. they are liable to suffer discoloration and a decrease of viscosity. It is known, that by stablization this drawback can be more or less overcome. The compounds, hitherto used for this purpose, however, only prevent either the discoloration or the decrease of viscosity.

Now, we have found that certain heterocyclic sulfur compounds prevent the decrease of viscosity due to heat for a prolonged time and, at the same time, do not change the color and transparency of the foils. The sulfur compounds, added according to the present invention, are benzothiazolyl- and thianthrene-compounds, especially compounds of the formulae:

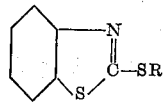

in which R stands for hydrogen or the radical

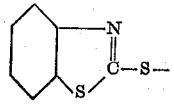

and

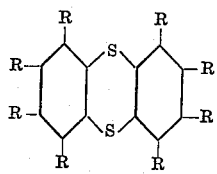

in which R stands for hydrogen or lower alkyl.

The new stabilizers have the advantage of being capable of combination with each other or with known stablizers so that for each intended use and for each polyvinyl acetal an optimum of stability may be obtained. In addition thereto, some of the compounds used according to the present invention, for instance, the derivatives of thianthrene, act as plasticizers so that, when they are used, the quantity of the usually applied plasticizers can be reduced. Used alone, the new stabilizers are particularly advantageous for stabilizing safety glass foils since the addition of large quantities of other foreign matter may detrimentally affect the transparency.

The new stabilizers may be admixed before, during or after the acetalization. The quantities to be added depend upon the stability requirements to be fulfilled by the resins in each particular case and, in general, are small, for example, ranging from about 0.5% and amounts up to about 10%, calculated on the weight of the resin.

Of particular advantage are plastic compositions which contain polyvinylacetal resins acetalized with aliphatic aldehydes. As it is known, those of these resins have gained special importance in which the hydroxyl groups of the polyvinyl alcohol are not completely acetalized but only within the range of 50% to 95%, above all the acetals of butyraldehyde, isobutyraldehyde, propionaldehyde, acetaldehyde, and formaldehyde.

The following examples serve to illustrate the invention but they are not intended to limit it thereto, the parts being by weight:

(1) Polyvinylacetaldehydeacetal, prepared from an aqueous solution of polyvinyl alcohol and acetaldehyde with hydrochloric acid or sulfuric acid as catalyst, is precipitated in a finely divided state. After separation of the acid, a quantity of dibenzothiazolyl-2.2'-disulfide

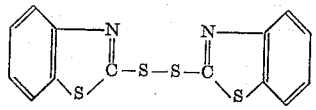

amounting to 0.5% of the weight of the acetal is added to the acetal suspension and the whole is stirred for 2 hours at 40° C. The acetal is then filtered with suction, washed with a small amount of water and dried. Foils prepared from this powder and plasticized by addition of tricresylphosphate are freely suspended and heated for 24 hours at 110° C. They only increase in length by at most 25% and yellowing does not take place.

Compositions of polyvinylbutyrals, especially those acetalized within the range of 50% and 95%, may be prepared in the same manner.

(2) Polyvinylacetate is dissolved in concentrated hydrochloric acid and condensed in the usual manner by addition of a 40% formaldehyde. The formal is then precipitated in a finely divided state by addition of ice-cold water. After removal of the acid, 1.0% of 2-mercaptobenzothiazol

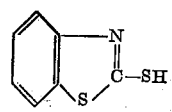

calculated upon the formal, is added, while stirring. The batch is then heated for 1 hour at 60° C. and, after cooling, the product is filtered with suction, washed for a short time with water and dried. The stabilized formal in a solution of 5% strength cyclohexanone has a viscosity of 38.5 centipoises which is not reduced by heating the formal for 4 hours to 130° C. When unstabilized resins are heated for 2 hours, the viscosity of a corresponding solution drops from 38 to 26 centipoises and, when heated for a prolonged time, the products become insoluble.

Compositions of polyvinylbutyrals, especially those acetalized within the range of 50% to 95%, may be prepared in the same manner.

(3) 414 parts of polyvinylbutyral, prepared according to known condensation processes and not entirely acetalized, are dissolved in 1400 parts of methanol and 177.7 parts of triglycol-di-isobutyrate and 8.3 parts of 2.3.6.7-tetramethyl-thianthrene.

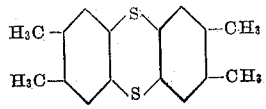

are added. From this solution foils may be prepared in the usual manner which are colorless and elastic and are particularly suitable as intermediate layers for safety glass.

By heating freely suspended foils to 110° C., an increase of their length of less than 25% occurs only after 2 hours and no yellowing is to be observed, whereas nonstabilized foils melt already after 90 minutes with formation of a yellow mass.

(4) 200 parts of polyvinylbutyral, prepared in the usual manner, are dissolved in 680 parts of methanol and 85 parts of phthalic acid dibutylester and 4 parts of 2.6-dimethylthianthrene are added. Foils, cast from this solution, are colorless and suitable as intermediate layers of safety glass. If the foils are heated to 110° C., their color hardly changes and only after 2 hours they show an increase of length of about 30%, whereas untreated foils melt already after 1½ hours with formation of a shapeless yellow mass.

Instead of the stabilizers mentioned in Examples 3 and 4, other thianthrene compounds may also be used, for instance, thianthrene itself which is not substituted by alkyl radicals, furthermore, thianthrenes in which the methyl groups stand in other positions or which contain ethyl groups.

We claim:

1. A plastic composition comprising a saturated polyvinyl acetal resin admixed with an amount between about 0.5% and about 10% by weight of the resin of a stabilizing agent selected from the group consisting of 2-mercaptobenzothiazole, dibenzothiazolyl-2,2'-disulfide, thianthrene, and lower alkyl substituted thianthrenes.

2. A plastic composition according to claim 1, wherein said polyvinyl acetal resin is acetalized within the range of 50–95% with a saturated aliphatic aldehyde.

3. A plastic composition according to claim 1, wherein said polyvinyl acetal resin is acetalized within the range of 50–95% with a butyraldehyde.

4. A plastic composition comprising a polyvinyl acetal resin acetalized with butyraldehyde, admixed with an amount between about 0.5% and about 10% of dibenzothiazolyl-2,2'-disulfide.

5. A plastic composition comprising a polyvinyl acetal resin acetalized with acetaldehyde, admixed with an amount between about 0.5% and about 10% of dibenzothiazolyl-2,2'-disulfide.

6. A plastic composition comprising a polyvinyl acetal resin acetalized with formaldehyde admixed with an amount between about 0.5% and about 10% of 2-mercaptobenzothiazol.

7. A plastic composition comprising a polyvinyl acetal resin acetalized with butyraldehyde, admixed with an amount between about 0.5% and about 10% of 2,3,6,7-tetramethylthianthrene.

8. A plastic composition comprising a polyvinyl acetal resin acetalized with butyraldehyde, admixed with an amount between about 0.5% and about 10% of 2,6-dimethylthianthrene.

References Cited in the file of this patent

UNITED STATES PATENTS

| Number | Name | Date |
|---|---|---|
| 2,234,215 | Youker | Mar. 11, 1941 |
| 2,527,495 | Fitzhugh | Oct. 24, 1950 |